United States Patent Office 3,686,258
Patented Aug. 22, 1972

3,686,258
THIOALKANOATE CHEMICAL INTERMEDIATES
Andrew Oroslan, Forest Hills, N.Y., Stephen B. Sello, Cedar Grove, N.J., and Giuliana C. Tesoro, Dobbs Ferry, N.Y., assignors to J. P. Stevens & Co., Inc., New York, N.Y.
No Drawing. Application Sept. 5, 1967, Ser. No. 665,289, now Patent No. 3,485,815, which is a continuation-in-part of application Ser. No. 347,365, Feb. 26, 1964. Divided and this application Oct. 22, 1969, Ser. No. 871,199
Int. Cl. C07c 153/07
U.S. Cl. 260—455 R    2 Claims

ABSTRACT OF THE DISCLOSURE

Compounds of the formula

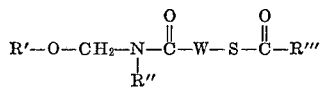

wherein R' and R" are hydrogen or lower alkyl, W is an alkylene linking group which may contain a hydroxyl or ether group and R''' is a hydrocarbyl group of 1–10 carbon atoms, are useful as intermediates in forming cellulosic polymer modifiers.

---

This application is a division of application Ser. No. 665,289, filed Sept. 5, 1967, now U.S. Pat. No. 3,485,815, which in turn was a continuation-in-part of application Ser. No. 347,365, filed Feb. 26, 1964, now abandoned.

This invention relates to a method of modifying cellulosic polymers and more particularly to a method of modifying a material comprising cellulosic polymers. The invention also relates to organic reactants which are suitable for treating cellulosic polymers in accordance with the method of the present invention.

Wool fibers consist primarily of long chain polymers which are crosslinked by disulfide radicals. These disulfide crosslinks impart certain useful properties to the wool fibers. Thus, for example the disulfide crosslinks can be opened, the fibers may be given a desired configuration, and the crosslinks then reformed in order to stabilize the fibers in their new configuration. Permanent creasing of wool fabrics is one important commercial utilization of the naturally occurring disulfide linkages.

In view of the widely accepted importance of disulfide crosslinks in imparting desirable properties to wool fibers, it is apparent that the introduction of such crosslinks into cellulosic polymers is a desirable objective. The disulfide-mercaptan system is especially desirable due to the ease of conversion of one form to the other.

In addition to the advantages resulting from the reversibility of the disulfide-mercaptan linkage, the modification of cellulosic polymers by introduction of this system is important for another reason. The reactivity of cellulosic polymers is somewhat limited since the hydroxyl groups provide the only reactive sites. Since mercapto groups are much more reactive than hydroxyl groups in many organic reactions, the introduction of mercapto groups into cellulosic polymers increases the reactivity of the cellulose in organic reactions such as alkylation and graft polymerization.

In view of the foregoing, it is an object of the present invention to provide a method of modifying a material comprising cellulosic polymer molecules by introducing disulfide or mercapto radicals into the cellulosic polymer molecules.

It is another object of this invention to provide organic reactants including a mercapto radical or a disulfide radical for use in treating cellulosic polymer molecules in accordance with the method of this invention.

Briefly stated, one embodiment of the present invention is the method of modifying a material comprising cellulosic polymer molecules comprising the steps of providing an organic reactant embodying (A) a cellulose-reactive group, such as formyl (—CHO), or an N-methylol carbamoyl radical having the formula:

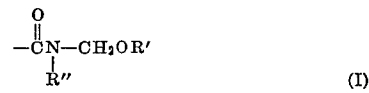

wherein R' and R" are hydrogen or substituted or unsubstituted hydrocarbyl, such as substituted or unsubstituted alkyl of from 1 to 4 carbon atoms;

and (B) a sulfur-containing group such as a disulfide radical or a mercapto radical in a free or protected form, as acylthio; said cellulose-reactive group and said sulfur-containing group being separated by a divalent organic linking radical containing at least one intralinear carbon; and treating said material with said organic reactant in the presence of an acidic catalyst.

The organic reactants can be represented by the general formula:

$$(ZW)_nX \qquad (II)$$

wherein Z is said cellulose-reactive group; W is said linking radical; X is mercapto or protected mercapto, e.g., acylthio, or a disulfide group; and $n$ is an integer having a value of 1 when X is free or protected mercapto and a value of 2 when X is disulfide.

When $n$ in Formula I has a value of 2, the ZW-groups may be the same or different.

As noted above, the cellulose-reactive group can be formyl. Alternatively it may be a group which, under the reaction conditions (i.e., in an acidic medium) yields a formyl radical, such as an aldehyde acetal group of the formula:

$$-CH(OR)_2 \qquad (III)$$

wherein R is substituted or unsubstituted hydrocarbyl, such as substituted or unsubstituted alkyl having 1 to 4 carbon atoms.

Compounds having the aldehyde acetal grouping, when subjected to the conditions hereinafter described for the treatment of cellulose, form the formyl group which then reacts with the celluose. This conversion of acetal to aldehyde is illustrated by the following equation, employing a mercapto acetal for purpose of illustration:

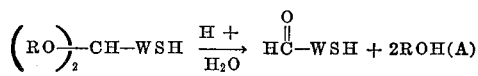

Accordingly, as employed in the specification and claims, the term "formyl" is intended to embrace groups such as aldehyde acetal groups which yield formyl groups in aqueous acidic media.

The sulfur-containing radicals represented by X in Formula I serve to provide sites, which may be opened or closed by selection of oxidation-reduction conditions. Thus, disulfide-modified cellulosic polymers can be reduced to the mercapto form, and the latter can be oxidized to produce the disulfide as shown by schematic Equation B in which "Cell" represents a cellulosic polymer and B denotes a connecting radical.

(B)  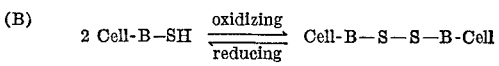

Thus, if a mercapto type of reactant is used to form disulfide crosslinks in accordance with the present method, only one cellulose-reactive functional group need be present in the reagent molecule. The crosslink between cellulosic polymers in such instance is formed by reaction of two mercapto-containing chains to form a disulfide linkage.

When employing the mercapto type of reactant it is frequently desirable to have the mercapto group in a protected form to prevent premature disulfide formation by oxidation due to atmospheric oxygen which may be present during pregnation of the reactant, or during treatment of cellulose. A suitable protective form of the mercapto group is the acylthio group of the formula:

  (IV)

wherein R''' is substituted or unsubstituted hydrocarbyl such as substituted or unsubstituted alkyl or aryl having from 1 to 10 carbon atoms.

The acylthio group is inaffected by the acidic media employed during the reaction of the organic reactant with cellulose, but the acyl protecting group may be readily removed (i.e., the acylthio group is converted to mercapto), by treatment with base.

If a disulfide-containing reactant is used to form disulfide crosslinks, there must be two cellulose-reactive functional groups present. The crosslink in this case is formed by reaction of one cellulose-reactive functional group with a first cellulosic polymer molecule, and reaction of the second group with a second cellulosic polymer molecule.

The cellulose-reactive functional group must be separated from the sulfur-containing radical by at least one carbon atom to prevent splitting of the compound at this juncture. Preferably, the cellulose-reactive functional group should be separated from the sulfur-containing radical by a substituted or unsubstituted alkylene radical having from 1 to 4 carbon atoms.

Substituents which may be present on the various groups defined above include any substituent which is inert under the reaction conditions. Particularly desirable substituents are those wherein oxygen is present in the form of a hydroxyl group or an ether linkage, which improve the solubility of the organic reactant in water and make them more attractive for commercial utilization.

Some typical examples of organic reactants which are suitable for the practice of this invention are as follows:

(1) $$\left[ HO-CH_2-N(H)-\overset{O}{\underset{\|}{C}}-(CH_2)_2-S- \right]_2$$

(2) $$\left[ HO-CH_2-N(H)-\overset{O}{\underset{\|}{C}}-CH_2-S- \right]_2$$

(3) $$\left[ HO-CH_2-N(H)-\overset{O}{\underset{\|}{C}}-(CH_2)_2-O-(CH_2)_2-S- \right]_2$$

(4) $$\left[ HO-CH_2-N(H)-\overset{O}{\underset{\|}{C}}-CH_2-CH(OH)-CH_2-S- \right]_2$$

(5) $$\left[ HO-CH_2-N(CH_3)-\overset{O}{\underset{\|}{C}}-CH_2-CH(CH_3)-S- \right]_2$$

(6) $$\left[ CH_3-O-CH_2-N(H)-\overset{O}{\underset{\|}{C}}-(CH_2)_2-S- \right]_2$$

(7) $$\left[ (CH_3-O)_2-CH-CH_2-S- \right]_2$$

(8) $$\left[ (C_2H_5-O)_2-CH-CH_2-CH_2-S- \right]_2$$

(9) $$H\overset{O}{\underset{\|}{C}}-CH(SH)-CH_2OH$$

(10) $$\left[ H\overset{O}{\underset{\|}{C}}-CH_2-CH_2-O-CH_2-CH_2-S- \right]_2$$

Although most of the above compounds are of the disulfide type, it is to be appreciated that the mercapto form corresponding to the disulfide compounds may be formed by reduction, and those mercapto compounds are considered included in the foregoing illustrative list.

Compounds (1)–(6) contain the N-methylol amide type of cellulose-reactive functional group; compounds (7) and (8) contain the aldehyde acetal type of group; and compounds (9) and (10) contain the aldehyde type of group.

In compounds (3) and (10) the cellulose-reactive function groups are separated from the sulfur-containing groups by a radical containing an ether linkage. In compounds (4) and (9) there is a hydroxyl substituent.

Each of the disulfides discussed above is symmetrical—that is, the portions of the molecule on either side of the sulfur atoms are identical. The present invention is intended cover unsymmetrical disulfides as well, and these may be made, for example, by mild oxidation of a mixture of two mercapto compounds.

Typical temporarily protected forms of the thiols which may be used as organic reactants in the practice of this invention are as follows:

(11) 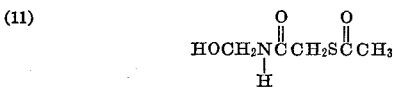

(12) 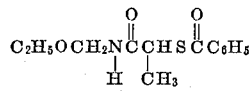

(13) 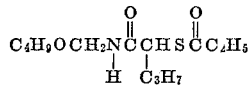

(14) 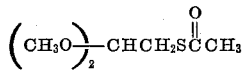

(15) 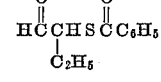

Sulfur-containing compounds of the N-methylol amide type can be prepared by conventional techniques. The preparation of one such compound (Compound 1) is illustrated as follows:

Example 1

First an intermediate having the following formula was prepared:

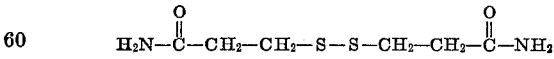

To this end 64 grams of sulfur were added at room temperature to 240 grams of $Na_2S \cdot 9H_2O$ dissolved in 2000 ml. of water while stirring. This mixture was warmed up to 70° C. and kept at this temperature until the sulfur went into solution. Then the solution was cooled to room temperature and 284 grams (4 moles) of acrylamide dissolved in 400 ml. water were allowed to drip into this solution over a period of 30 minutes. The reaction was slightly exothermic. After half of the acrylamide solution was added, a crystalline product started to precipitate. After the addition of acrylamide was completed, the reaction mixture was stirred for additional 30 minutes, then filtered. The crude product was washed with water, dried and recrystallized from 4500 ml.

ethanol. The weight of recrystallized product was 195 grams, corresponding to a 47% yield.

The melting point of the product was 160° C.–162° C., the sulfur content was 31.03% by weight and the nitrogen content 13.09% by weight. The theoretical sulfur content of the above intermediate is 30.80% and the theoretical nitrogen content is 13.45%.

In the second part of this procedure 156 grams (0.75 mole) of the intermediate was slurried in 1900 ml. of water. The pH of the aqueous slurry was adjusted to 8.0–8.2 by adding a few drops of 5 N NaOH. The aqueous slurry was heated to 65° C. with stirring. A clear solution was obtained. 123 grams of 37% aaqueous formaldehyde solution (1.5 moles) were allowed to drip into this solution over a period of 1 hour. After stirring for 10 hours, 73% conversion (determined from the decrease in free formaldehyde content of the reaction mixture by using hydroxylamine hydrochloride) was achieved. By partially distilling off the water under reduced pressure, the reaction mixture was concentrated to 300 grams. After chilling in the refrigerator overnight, 1800 ml. methyl ethyl ketone were added. A white crystalline product was obtained and filtered. It was recrystallized from 98 grams corresponding to a 48.5% yield, M.P.: 129–132° C. The product was slightly soluble in water and very soluble in mixture of water with organic solvents.

"S" content: 23.90% (Theor. 23.88%)
"N" content: 10.53% (Theor. 10.45%)
"OH" content: 12.31% (Theor. 12.70%).

The procedure outline in Example 1 can be generally employed for the conversion of dithioamides of the formula:

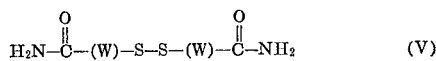

(where W is defined as in Formula II)

to the corresponding bis(N-methylol) amides:

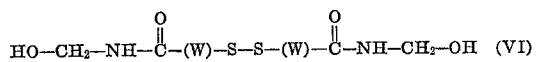

In the presence of excess alcohol [R'OH, where R' is defined as in Formula I] and by suitable changes in the solution pH during the reaction with formaldehyde, the corresponding bisalkoxymethyl amides:

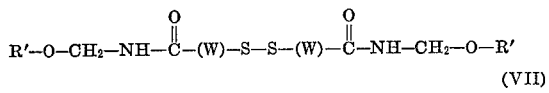

can also be obtained.

If N-substituted amides:

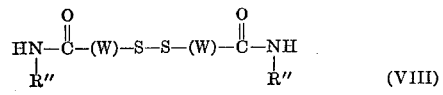

[where R" and W are defined as above]

are used as the intermediates, the reaction with formaldehyde will occur on the free hydrogen and the corresponding N-subtsituted reactants will be obtained.

The intermediate dithioamides required for the preparation of the new reactants can be prepared from the corresponding unsaturated compounds as shown in Example 1, or by converting a haloamide to a mercaptan, for example:

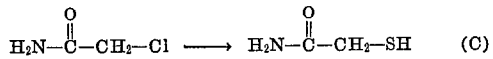

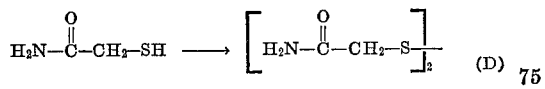

or by reacting a sulfur containing acid chloride with ammonia or an amine, for example:

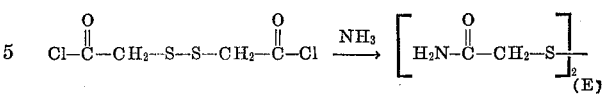

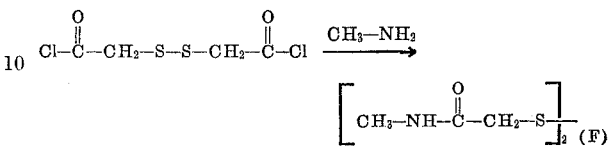

Preparation of a preferred temporarily protected reactant, 2-(acetylthio)-N-(hydroxymethyl) acetamide is illustrated by the following example:

Example 2

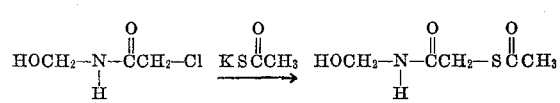

A total of 308 grams (4.05 moles) of thioacetic acid was added gradually to a solution of 266 grams of 85% potassium hydroxide (4.05 moles) in 2 liters of ethanol while nitrogen was bubbled through the solution. Then a total of 500 grams (4.05 moles) of 2-chloro-N-(hydroxymethyl) acetamide was added to the solution of potassium thioacetate while the temperature of the reaction mixture was kept somewhat under 50° C. Stirring was continued until the reaction mixture cooled to room temperature. By-product potassium chloride was removed by filtration and dried. Its weight was 303 grams (theoretically 302 grams). Ethanol was evaporated from the filtrate, leaving 662 grams of solid (theoretically 660 grams) of 2-(acetylthio)-N-(hydroxymethyl) acetamide, which upon being recrystallized from ethyl acetate in 72% yield, melted at 93 to 96.5° C. (104 to 105° C. after recrystallization from benzene.) Analysis of bound formaldehyde indicated a purity of 96.2%, (17.7% found compared with 18.4% required for $C_5H_9NO_3S$). Absorption bands in the infrared spectrum were those expected for the structure shown above.

This procedure is not limited to thiol S-esters of N-(hydroxymethyl) amides, but can be applied generally to aldehydes, acetals, or N-(oxymethyl) alkanamides which have a halogen atom (chlorine, bromine or iodine) bonded to the carbon atom which ultimately is to hold a mercapto group or a dithio group. An alkali metal salt of a thiocarboxylic acid is used to effect a replacement reaction. Thus, the acetylthio group can be provided by potassium thioacetate and the benzoylthio group can be provided by sodium thiobenzoate.

In general, the organic reactants of this invention are utilized in a solvent, preferably water. Assuming the material to be modified is a cotton fabric, a solution of one of the organic reactants is applied to the fabric by dipping, spraying, padding or other suitable manner. The process requires acidic conditions, or in other words, the presence of an excess of hydrogen ions. It is believed that the reaction of the aldehyde type of compound with a collulosic polymer molecule is as follows:

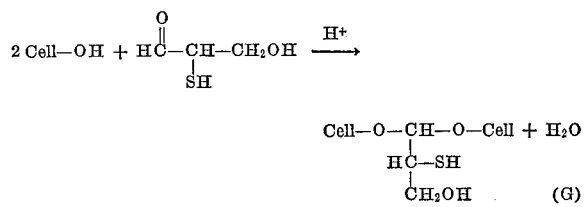

The treatment of cellulosic polymer molecule with compounds including an N-methylol amide radical proceeds generally as follows:

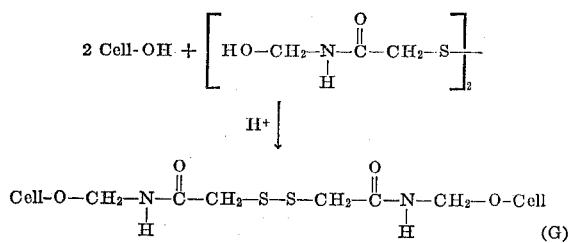

Although the solvent utilized to form the solution of the sulfur-containing reactant is preferably water, when the solubilities of the reactants in water are not sufficient for the desired purposes, the water may be mixed with a compatible organic solvent, or an organic solvent alone may be used.

The amount of the sulfur-containing reactant to be applied to the cellulosic material generally should be in the range of from 2% to 30%, based on the weight of the cellulosic polymer molecules in the material being treated. Of course, the particular strength which is selected will be based on the extent of modification which is required for the particular properties which are desired. It has been determined that the use of from 5% to 15% of sulfur-containing reactant, based on the weight of the cellulosic polymer molecules, is sufficient to impart excellent properties.

As indicated, the treatment of cellulosic polymer molecules with the sulfur-containing reactants of this invention must be conducted under acidic conditions. Acidic catalysts which are suitable for use with the present invention include the ammonium salts of mineral acids such as hydrochloric, sulfuric, phosphoric, perchloric and nitric; amine salts of mineral acid; the chlorides and nitrates of zinc and magnesium; acid fluoride salts; zinc fluoroborate and others of this type. In addition to the above salts, nonvolatile acids of moderate strength such as oxalic acid and sodium hydrogen sulfate may also be employed.

Some of the above acidic catalysts, such as magnesium chloride are acid-forming and provide acidic conditions upon heating. When such catalysts are used, the treated material must be heated to the temperature level necessary for production of the requisite acid conditions.

If the acidic catalyst is of the type that does not require heating to form hydrogen ions, for example, those catalysts which form hydrogen ions upon hydrolysis or ionization in a solvent, the catalytic activity is generally controlled by appropriate choice of the pH of the treating solution. In such instance, the pH of the treating solution should be higher than about 3.5 since the use of acid catalysts yielding a substantially lower pH may adversely affect the cellulosic material being treated.

The term "acidic catalyst" as used in this specification and in the claims appended hereto is intended to include those substances which are acidic per se as well as those compounds or materials which have the latent ability to provide acidic conditions in situ, for example, by exposure to elevated temperature.

After treatment with the organic reactant and catalyst, the treated cellulose is generally dried at a relatively low temperature and then heated to a higher temperature for a short period of time to accelerate the reaction between the cellulose and the sulfur-containing reactant. Preferably, the higher temperature step is conducted at temperatures in the range of 140° C. to 175° C. for a time in the range of about 2 minutes to 10 minutes. Of course, temperatures lower than 140° C. may be used with a corresponding increase in the time.

The term "cellulosic polymer molecule" as used herein is intended to denote the cellulose polymer molecules as they occur naturally in the form of cotton, linen and wood. It is also intended to embrace modified cellulose such as regenerated cellulose including viscose, cuprammonium rayon and saponified cellulose acetate, cellulose film; soluble modified cellulose such as hydroxyethyl cellulose and carboxymethyl cellulose; and the like provided the modified polymer molecules contain free hydroxyl groups. The cellulose can be in the form of textile fibers which have been manufactured into fabric, or in the form of films, fibers, or yarns. Cellulose fibers may be incorporated into yarns and fabrics together with other textile fibers, and the composite material may be treated by the present process. In addition, such natural cellulosic materials as wood and linen may also be treated in accordance with the present invention.

Cellulose which has been treated in accordance with this invention is reversibly cross-linkable whereby disulfide linkages can be cleaved by reduction (incorporation of hydrogen) and reformed by oxidation (abstraction of hydrogen). When the modified cellulosic material is in the reduced or mercapto form the material may be creased or otherwise shaped and then exposed to a mild oxidizing treatment to restore the disulfide crosslinks.

Oxidizing agents for forming disulfide crosslinks in the complex cellulosic polymers containing mercapto groups include hydrogen peroxide, sodium perborate, gaseous oxygen with anydrous ferric sulfate in dimethyl sulfoxide [C. G. Overberger et al., J. Am. Chem. Soc., vol. 87, 4125–4130 (1965)], and atmospheric oxygen, as well as iodine [R. F. Schwenker et al., Textile Res. J., vol. 32, 797–804 (1962), and vol. 33, 107–117 (1963)].

Reducing agents for rupturing disulfide crosslinks and forming mercapto groups include alkali and ammonium salts of aliphatic mercaptans such as thioglycolic acid, thioglycerol, mercaptoethanol and the like, neutralized tetrakis (hydroxymethyl) phosphonium chloride, sodium hydrogen sulfide with sodium sulfite, tributylphosphine, sodium tetrahydroborate and water, and 1,4-dimercapto-threo-2, 3-butanediol.

In addition, disulfide cleavage may result from simultaneous reduction and oxidation (disproportionation by a base).

The mercapto form of cellulosic derivatives produced by the methods of this invention can be further modified to new and useful compositions by alkylation in any of several ways. One such method is by reaction with activated vinyl compounds, such as acrylonitrile, divinyl sulfone and N-ethylmaleimide. Another is by metathesis, a replacement reaction which involves treating the mercapto-containing polymer with strong base such as sodium hydroxide, to make the S-sodium derivative, followed by reaction with a halogen-containing compound. For instance, iodoalkanes require about 6 hours at 50° C. when used as a 5% by weight solution in dimethylformamide free of molecular oxygen. Such as replacement reaction is not confined to haloalkanes, and iodoacetamide, bromoacetaldehyde acetals, and chloroacetonitrile are examples of other compounds which are suitable.

Whether formed by addition or replacement, the resulting organic sulfides are stable derivatives (sulfur analogues of ethers). In this manner one can provide modified forms of cellulose in a more facile fashion than by previous techniques or provide forms heretofore unattainable because of the higher reactivity of the mercapto groups as compared with cellulosic hydroxyl groups.

The following examples are illustrative of the methods by which cellulose may be modified in accordance with this invention. In these examples, the following test methods and analytical procedures were employed:

(1) Crease recovery.—Monsanto Test Method ASTM D–1295–60 T, October 1961. Reported as the sum of the crease recovery angles in the warp and filling directions $(W+F)$ after one laundering according to AATCC 88–1961 T, Test III C–2.

(2) Tear strength. — Elmendorf Method ASTM D–1424–59. Reported in pounds.

(3) Tensile breaking strength.—One-inch ravelled strip method; ASTM D–1682–59T. Reported in pounds.

(4) Moisture regain.—Moisture gained on conditioning (relative humidity 65±2% at 21±1° C.) based on the oven-dry weight; ASTM D–629–59T. Reported in percent.

(5) Efficiency of utilization of reagent (in percent)

$$= \frac{\text{(equiv. wt. of reagent)(observed wt. gain)(100\%)}}{\text{(equiv. wt. of group of atoms becoming bonded to polymer)(percent OWF)}}$$

The reagent was padded on the fabric from an aqueous solution which also contained magnesium chloride (12 to 15% $MgCl_2$ based on the weight of the reagent) as a catalyst. After padding, the fabric samples were framed to the original dimensions, dried (2 minutes at 65° C.), cured (5 minutes at 150° C.), washed thoroughly, framed, and dried. Data relating to the treatment of the fabric samples and the resulting products are summarized in Table I.

TABLE I

| Sample | Reagent, percent OWF | Moisture regain, percent | Weight gain, percent [1] | Calculated [2] S | Calculated [2] N | Found S | Found N |
|---|---|---|---|---|---|---|---|
| A | 22.1 | 4.4 | 12.8 | 2.52 | 1.12 | 3.46 | 1.05 |
| B | 13.4 | 4.6 | 10.4 | 2.8 | 0.92 | 2.00 | 0.97 |
| C | 8.6 | 4.9 | 7.5 | 1.55 | 0.68 | 1.49 | 0.74 |
| D | 6.6 | 5.3 | 6.7 | 1.41 | 0.62 | 1.20 | 0.60 |
| E | 4.3 | 5.6 | 4.1 | 0.86 | 0.38 | 0.85 | 0.40 |
| F | 2.6 | 6.0 | 2.3 | 0.50 | 0.22 | 0.48 | 0.26 |

[1] Corrected for change in moisture regain.
[2] Calculated from the corrected weight gain for the cellulose derivative, $CellOCH_2NHCOCH_2SCOCH_3$.

(6) Thiol sulfur.—The sample (approximately 0.08 gram) was kept for 5±1 days at room temperature in 100 ml. of solution containing 0.0125 gram of N-ethylmaleimide

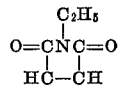

buffered at pH 3.5. Its reaction with thiol groups was determined quantitatively from the change in ultraviolet absorbance at 300 millimicrons, as described by R. W. Burley and F. W. A. Horden, Textile Res. J., vol. 27, 615–622 (1957).

(7) Disulfide sulfur.—The sample (approximately 0.24 gram) was kept for 24 hours in 25 ml. of nitrogen-flushed water containing 0.020 gram of 1,4-dimercapto-threo-2,3-butanediol

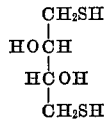

| Sample | Total (W+F) crease recovery angle, degrees Dry | Total (W+F) crease recovery angle, degrees Wet | Warp tensile strength pounds | Warp tear strength, pound |
|---|---|---|---|---|
| A | 263 | 238 | 38 | 1.0 |
| B | 249 | 243 | 37 | 1.0 |
| C | 242 | 232 | 39 | 1.0 |
| D | 235 | 231 | 37 | 1.0 |

Example 4

Samples of fabric resulting from treatment similar to that described in Example 3 were treated under nitrogen with 0.2-normal sodium hydroxide solution at a fabric-to-liquor weight ratio of 1-to-30 for 30 minutes at room temperature. Then they were washed thoroughly in succession with water, aqueous 2% acetic acid, again with water, and finally dried. Samples were kept under nitrogen until physical testing and analyses were performed. The test results are summarized in Table II as Sample A, together with similar data obtained on (B) a fabric sample resulting from treatment similar to that described in Example 3 so that the nitrogen content was 1.05%, and (C) an untreated specimen of the printcloth.

TABLE II

| Sample | Form | W+F crease recovery angle, degrees Dry | W+F crease recovery angle, degrees Wet | Warp tensile strength, lbs. | Percent N | Percent Thiol S |
|---|---|---|---|---|---|---|
| A | Thiol | 174 | 238 | 39 | 1.0 | 1.85 |
| B | S-ester | 259 | 246 | 39 | 1.05 | 0.25 |
| C | Untreated | 182 | 172 | 56 | 0 | 0 |

The amount of o-dithiane-4,5-diol

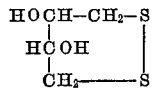

formed from reaction (transfer of hydrogen atoms) with the cellulosic disulfide derivative was determined quantitatively from ultraviolet absorbance at 284 millimicrons, read against a reagent blank used to treat unmodified cotton. References: W. W. Cleland, Biochemistry, vol. 3, 480–482 (1964); H. D. Weigmann and L. Rebenfeld, Textile, Res. J., vol. 36, pages 202–203 (1966).

Parts and percentages are by weight unless otherwise noted.

Example 3

Samples of de-sized, bleached, and un-mercerized plain-weave cotton fabric (commonly known as 80 x 80 printcloth) were treated with the 2-(acetylthio)-N-(hydroxymethyl)acetamide produced as described in Example 2.

Example 5

Samples of fabric comprising (2-mercaptoacetamido)-methylcellulose produced as described in Example 4 were treated with a neutral, aqueous 3% solution of hydrogen peroxide, with the fabric-to-liquor ratio at 1-to-30 by weight, for 30 minutes at room temperature. Then they were washed with water and dried. The resulting product comprised cellulose crosslinked through

groups which had total (warp plus filling) crease recovery angles of 242 degrees (dry) and 265 degrees (wet), a warp tensile strength of 37 pounds, 0.9% N, and 0.0% thiol sulfur.

Example 6

Samples of fabric comprising (2-mercaptoacetamido)-methyl-cellulose produced as described in Example 4 were extracted repeatedly with dimethyl sulfoxide to replace water. Then they were treated at room temperature for 30 minutes with a 0.1% solution of anhydrous ferric sulfate in dimethyl sulfoxide through which a vigorous stream of oxygen was passed. The fabric-to-liquor ratio was 1-to-30. At the end of the 30-minute oxidation, the samples were washed with water and dried. Data showing the history of the sample at each of the S-ester (A), the thiol (B) and the crosslinked stages are summarized in Table III.

to pH 7.0 with sodium hydroxide, with the fabric-to-liquor ratio at 1-to-30 by weight, for 2 hours at 40° C. Then the samples were washed with water and dried. The resulting thiol form was then treated with hydrogen peroxide to re-form the crosslinks. The cycle of cross-link cleavage and reformation was repeated. The data for this series of experiments are summarized in Table V, with Sample A being that produced in Example 5.

TABLE V

| Sample | Distinguishing composition | W+F crease recovery angle, deg. | | Warp tensile strength, lbs. | Percent | |
|---|---|---|---|---|---|---|
| | | Dry | Wet | | N | Thiols |
| A | Cross-linked | 242 | 265 | 37 | 0.95 | 0.0 |
| B | Thiol | 193 | 255 | 35 | 1.0 | 0.47 |
| C | Cross-linked | 233 | 269 | 32 | 0.9 | 0.10 |
| D | Thiol | 189 | 254 | 31 | 0.8 | 0.21 |
| E | Cross-linked | 233 | 269 | 29 | 1.0 | 0.07 |

TABLE III

| Sample | Form | W+F crease recovery angle, deg. | | Warp tensile strength, lbs. | N, percent | S | | | Sample |
|---|---|---|---|---|---|---|---|---|---|
| | | Dry | Wet | | | Total, percent | Thiol, percent | —SS—, percent | |
| A | S-ester | 260 | 249 | 37 | 1.30 | 2.48 | None | 0.08 | A |
| B | Thiol | 192 | 229 | 38 | | 2.25 | 1.14 | None | B |
| C | Cross-linked | 184 | 264 | 37 | | 2.28 | 0.01 | 1.26 | C |

Example 7

Samples of fabric comprising (2-mercaptoacetamido)-methyl-cellulose produced as described in Example 4 were exposed to air at 21±2% for periods of up to 10 weeks. The data for this series of experiments are summarized in Table IV.[1]

TABLE IV

| Sample | Period of time, weeks | W+F dry crease recovery angle, degrees | Sulfur content, percent | |
|---|---|---|---|---|
| | | | Thiol | —SS— |
| A | 0 | 198 | 1.29 | 0.47 |
| B | 2 | 250 | 0.94 | 0.51 |
| C | 5 | 273 | 0.83 | 0.55 |
| D | 10 | 289 | 0.68 | 0.72 |

[1] The relatively humidity of the air was 65±2%.

Example 9

A sample of fabric containing dithiobis(acetamidomethyl) crosslinks introduced by the method of Example 5 was used which had 0.72% nitrogen and 1.56% sulfur by analysis. The fabric was padded with an aqueous solution having 0.5 mole of sodium hydrogen sulfide and 0.5 mole of sodium sulfite per liter. In order to effect the exchange of hydrogen atoms between reactants, the sample was heated in steam for 10 minutes. The accompanying Table VI records the data on the modified cellulose in fabric form from preparation of the S-ester (A); formation of the thiol form (B); crosslinking according to Example 5 (C) and as it was carried through three cycles of reduction (acceptance of hydrogen atoms) and oxidation (dehydrogenation to form disulfide crosslinks) (D–I).

TABLE VI

| Sample | Form | W+F crease recovery angle, deg. | | Warp tensile strength, lbs. | Percent | |
|---|---|---|---|---|---|---|
| | | Dry | Wet | | N | S |
| A | S-ester | 260 | 243 | 37 | 0.70 | 1.64 |
| B | Thiol | 194 | 247 | 33 | 0.68 | 1.37 |
| C | Cross-linked | 267 | 279 | 35 | 0.72 | 1.56 |
| D | Thiol | 161 | 232 | 31 | 0.66 | 1.35 |
| E | Cross-linked | 237 | 281 | 33 | 0.66 | 1.23 |
| F | Thiol | 164 | 231 | 24 | | |
| G | Cross-linked | 222 | 261 | 30 | | |
| H | Thiol | 169 | 242 | 25 | | |
| I | Cross-linked | 211 | 254 | 27 | | |

Example 8

Samples of fabric containing dithiobis(acetamidomethyl) crosslinks produced as described in Example 5 were treated after nitrogen with an aqueous 20% solution of tetrakis(hydroxymethyl)-phosphonium chloride adjusted

Example 10

A sample of fabric identical with Sample C of Example 9 was immersed for 2 hours at 40° C. in an aqueous solution containing 0.5 mole of tributylphosphine per liter to cleave the disulfide cross-links. This sample (D) was then cross-linked with hydrogen peroxide as described in Example 5 (Sample E). Two additional cycles of cleavage with tributylphosphine and oxidation with hydrogen peroxide were performed. (F–I). The results of these experiments are summarized in Table VII.

TABLE VII

| Sample | Form | W+F crease recovery angle, deg. | | Warp tensile strength, lbs. | Percent | |
|---|---|---|---|---|---|---|
| | | Dry | Wet | | N | S |
| C | Disulfide | 267 | 279 | 35 | 0.72 | 1.56 |
| D | Thiol | 201 | 255 | 33 | 0.74 | 1.26 |
| E | Disulfide | 252 | 266 | 33 | 0.68 | 1.05 |
| F | Thiol | 223 | 250 | 31 | | |
| G | Disulfide | 240 | 268 | 32 | | |
| H | Thiol | 221 | 261 | 30 | | |
| I | Disulfide | 238 | 256 | 33 | | |

Example 11

A sample of fabric identical with Sample C of Example 9 was padded with an aqueous solution composed of 5 parts of sodium tetrahydroborate and 95 parts of 0.2-normal sodium hydroxide. Reaction to cleave the disulfide crosslinks was effected by heating the sample in steam for 5 minutes. The product (Sample D) was recross-linked by treatment with hydrogen peroxide (Sample E). Two additional cycles (Samples F–I) were performed. The results of these experiments are summarized in Table VIII.

TABLE VIII

| Sample | Form | W+F crease recovery angle, deg. | | Warp tensile strength, lbs. | Percent | |
|---|---|---|---|---|---|---|
| | | Dry | Wet | | N | S |
| C | Disulfide | 267 | 279 | 35 | 0.72 | 1.56 |
| D | Thiol | 201 | 235 | 32 | 0.65 | 1.29 |
| E | Disulfide | 238 | 258 | 31 | 0.64 | 1.21 |
| F | Thiol | 181 | 233 | 29 | | |
| G | Disulfide | 219 | 250 | 30 | | |
| H | Thiol | 170 | 238 | 29 | | |
| I | Disulfide | 228 | 246 | 26 | | |

Example 12

A sample of fabric containing dithiobis(acetamidomethyl) crosslinks introduced by the method of Example 5 and subsequently reconverted to (2-mercaptoacetamido)methylcellulose by the method of Example 9 was padded with an aqueous 1% solution of sodium hydroxide, and without drying, the padded fabric was immersed in acrylonitrile for 30 minutes at room temperature. At the end of the period of time allowed for the addition reaction, the fabric was rinsed in water, next in dilute acetic acid, then thoroughly in water, and finally dried. Data showing the history and properties of the modified fabric are summarized in the accompanying Table IX. The increased percentage of nitrogen upon treatment with acrylonitrile indicated that chemical addition occurred.

TABLE IX

| Sample | Form | W+F crease recovery angle, degrees | | Total, percent | | Thiol S, percent |
|---|---|---|---|---|---|---|
| | | Dry | Wet | N | S | |
| A | S-ester | 244 | 245 | 0.74 | 1.4 | Trace |
| B | Thiol | 180 | 203 | Unanalyzed | | 1.4 |
| C | Disulfide | 227 | 276 | Unanalyzed | | Trace |
| D | Thiol | 180 | 228 | 0.80 | 1.4 | 1.4 |
| E | Acrylonitrile adduct | 206 | 257 | 1.16 | 1.4 | *0.99 |

*This percentage of thiol sulfur was calculated from the increase in percentage of nitrogen (the addition of acrylonitrile was not quantitative).

Acrylonitrile-modified products of this nature are heat-resistant and rot-resistant.

Example 13

The procedure of Example 12 was repeated, except that divinyl sulfone was used instead of acrylonitrile. Starting with Sample D of Example 12, data on the history and properties of the modified fabric are summarized in Table X. The increased percentage of sulfur upon treatment with divinyl sulfone indicated that chemical addition occurred.

TABLE X

| Sample | Form | W+F crease recovery angle, degrees | | Total, percent | | Thiol S, percent |
|---|---|---|---|---|---|---|
| | | Dry | Wet | N | S | |
| D | Thiol | 180 | 228 | 0.80 | 1.4 | 1.4 |
| E | Adduct | 194 | 294 | 0.74 | 2.2 | *1.6 |

*This percentage of thiol sulfur was calculated from the increase in percentage of sulfur (the addition of divinyl sulfone was not quantitative).

EXAMPLE 14

A sample of fabric characterized by containing the S-acetyl derivative of (2-mercaptoacetamido)methylcellulose was prepared by a method similar to that described in Example 3. The fabric so treated had the following properties:

N—1.30%
S—2.48%
Thiol S—None
Disulfide S—None
Crease Recovery:
  Dry—247 degrees
  Wet—237 degrees
Warp tensile strength—41 pounds Then, by using a procedure similar to that described in Example 4, the S-acetyl group was replaced by hydrogen, leaving free (2-mercaptoacetamido)methylcellulose. The sample was stored briefly in an atmosphere of dry nitrogen, and then padded with an aqueous 5% solution of sodium hydroxide to form the S-sodium derivative. The thus treated fabric was immersed for 6 hrs. at 50° C. in a solution consisting of 5 parts by weight of iodoethane and 95 parts by weight of dimethylformamide. During the 6-hour period, nitrogen was bubbled through the reaction mixture. At the end of the reaction period, the fabric sample was rinsed in dimethylformamide and water, then desiccated in dry gaseous nitrogen. The resulting S-ethyl derivative was then treated with hydrogen peroxide by the procedure of Example 5. Data relating to this sample are summarized in the accompanying Table XI, together with data on the thiol form, both before and after treatment with hydrogen peroxide.

form resulted from the 1-iodoalkanes, respectively, as listed in the heading:

[2-(isobutylthio)acetamido]methylcellulose,
[2-(pentylthio)acetamido]methylcellulose,
[2-(dodecylthio)acetamido]methylcellulose, and
[2-(octadecylthio)acetamido]methylcellulose.

Data relating to the various sample are summarized in Table XII, which includes data on a series of four corresponding samples subsequently treated with hydrogen peroxide as described in Example 5.

TABLE XII

| | | Before treatment with $H_2O_2$ | | | | | After treatment with $H_2O_2$ | | | | |
|---|---|---|---|---|---|---|---|---|---|---|---|
| | | Percent | | Warp tensile strength, lbs. | W+F crease recovery angle, deg. | | Percent | | Warp tensile strength, lbs. | W+F crease recovery angle, deg. | |
| Sample | S-alkyl | Wt. gain | Thiol S | | Dry | Wet | Disulfide S | Thiol S | | Dry | Wet |
| A | —$CH_2CH(CH_3)_2$ | 0.8 | None | 28 | 211 | 234 | 0.17 | None | 36 | 213 | 255 |
| B | —$(CH_2)_4CH_3$ | 1.7 | None | 35 | 218 | 259 | 0.10 | None | 35 | 224 | 262 |
| C | —$(CH_2)_9CH_3$ | 4.3 | None | 35 | 230 | 228 | 0.12 | None | 37 | 229 | 258 |
| D | —$(CH_2)_{17}CH_3$ | 8.3 | 0.06 | 36 | 213 | 224 | 0.18 | None | 30 | 226 | 240 |

Example 16

The fabric sample in the thiol form of Example 14 which had been treated with hydrogen peroxide to form disulfide cross-links was subjected to treatment similar to that described in Example 8 to reform the thiol groups. That is, the chemical reactions of Example 8 were applied to the crosslinked or disulfide form to yield (2-mercaptoacetamido)methylcellulose by a route different from that used for the starting material of Examples 14 and 15. The S-alkylation procedures of Examples 14 and 15 were then applied to produce [2-(ethylthio)acetamido]methylcellulose listed in Example 15. Data relating to the various samples are summarized in Table XIII, which includes data on a series of five corresponding samples subsequently treated with hydrogen peroxide as described in Example 5.

TABLE XIII

| | | Before treatment with $H_2O_2$ | | | | | After treatment with $H_2O_2$ | | | | |
|---|---|---|---|---|---|---|---|---|---|---|---|
| | | Percent | | Warp tensile strength, lbs. | W+F crease recovery angle, deg. | | Percent | | Warp tensile strength, lbs. | W+F crease recovery angle, deg. | |
| Sample | S-alkyl | Wt. gain | Thiol S | | Dry | Wet | Disulfide S | Thiol S | | Dry | Wet |
| E | —H [1] | ([2]) | 1.41 | 38 | 196 | 260 | 0.84 | 0.41 | 37 | 264 | 199 |
| F | —$C_2H_5$ | <0.1 | None | 37 | 212 | 255 | 0.23 | None | 39 | 233 | 245 |
| G | —$CH_2CH(CH_3)_2$ | <0.1 | 0.04 | 36 | 202 | 260 | 0.69 | None | 36 | 231 | 268 |
| H | —$(CH_2)_4CH_3$ | <0.1 | None | 36 | 208 | 266 | 0.25 | None | 37 | 236 | 262 |
| I | —$(CH_2)_9CH_3$ | 3.7 | None | 37 | 222 | 240 | 0.22 | None | 35 | 246 | 237 |
| J | —$(CH_2)_{17}CH_3$ | 7.0 | 0.03 | 35 | 214 | 226 | 0.34 | None | 35 | 234 | 235 |

[1] (2-mercaptoacetamido)methylcellulose prepared by the method of Example 8.
[2] Basis.

TABLE XI

| | Thiol | S-ethyl |
|---|---|---|
| Before treatment with $H_2O_2$: | | |
| Weight gain, percent | 0 | 0.2 |
| Thiol S, percent | 1.39 | None |
| Warp tensile strength, lbs | 39 | 36 |
| Crease recovery: | | |
| Dry, degree | 206 | 206 |
| Wet, degrees | 264 | 252 |
| After treatment with $H_2O_2$: | | |
| Disulfide S, percent | 1.80 | 0.12 |
| Thiol S, percent | None | None |
| Warp tensile strength, lbs | 32 | 35 |
| Crease recovery: | | |
| Dry, degrees | 257 | 203 |
| Wet, degrees | 278 | 233 |

EXAMPLE 15

The procedure of Example 14 was repeated four times, except that each time a different 1-iodoalkane was used in place of iodoethane. The following derivatives in fabric The introduction of hydrophobic alkyl groups by the methods described in Examples 14–16 permits the production of a water repellant cellulose derivative. If an alkylene dihalide is substituted for the alkyl halides one can form a permanently cross-linked product.

Example 17

Two samples of plain weave cotton fabric (commonly known as 80 x 80 print cloth), were treated with disulfide produced as described in Example 1. The disulfide was dissolved in a 1:1 by weight dimethylformamide-water solution which also contained magnesium chloride to provide acidic conditions. The magnesium chloride was added in the form of a buffered 30% aqueous solution (commercially available under the name "Aerotex Accelerator MX," sold by the American Cyanamid Co.). In Table XIV, the figures under the heading "percent $MgCl_2$ Soln." refer to the weight percent of "Aerotex Accelerator MX" used in the treating solution.

The fabric samples were impregnated with the solution using a laboratory padder and setting the rolls at a pressure to give 90–100% wet pickup.

The fabric samples so treated were framed to the original dimensions, and dried at 60° C., then heated to 163° C. for 4 minutes in a forced draft oven. The fabric samples were rinsed in a 1:1 dimethylformamide-water mixture, then washed with an aqueous solution of a non-ionic detergent. The samples were then framed and dried.

Table XIV below sets forth various data relating to fabric samples A and B.

TABLE XIV

| Sample | Treating solution | | Percent weight increase | Percent yield | Percent S | Percent N | S/N act. | S/N theor. |
|---|---|---|---|---|---|---|---|---|
| | Percent disulfide | Percent MgCl₂ soln.₂ | | | | | | |
| A | 8.0 | 6.0 | 6.5 | 91 | 1.26 | 0.57 | 2.22 | 2.28 |
| B | 5.0 | 3.75 | 3.9 | 95 | 0.82 | 0.39 | 2.10 | 2.28 |

The column head "Percent Disufide" and "Percent MgCl₂" contains the weight percent of the listed material in the solutions used to treat samples A and B.

The column headed "Percent Weight Increase" indicates the increase in weight of the finished sample as compared to the weight prior to treatment.

The column headed "Percent Yield" is an indication of the proportion of the disulfide reactant employed which reacts with the sample.

The columns headed "Percent S" and "Percent N" set forth the weight percent of sulfur and nitrogen contained in the cloth samples after treatment.

The column headed "S/N Actual" is the ratio of the weight percent sulfur from the column headed "Percent S" divided by the weight percent nitrogen as set forth in the column headed "Percent N."

The column head "S/N Theor." is the weight ratio of sulfur to nitrogen in the disulfide reactant used in the sample.

The samples were then tested for crease recovery against a control which was the same weave fabric as samples A and B without any treatment. The results are summarized in Table XV.

TABLE XV

| Sample | Crease recovery (W+F), degrees | |
|---|---|---|
| | Wet | Dry |
| A | 260 | 261 |
| B | 246 | 235 |
| Control | 142 | 147 |

Example 18

Example 17 was repeated using an amine hydrochloride to provide acidic conditions. (The amine hydrochloride used was 30% aqueous solution made by the Onyx Chemical Corporation, Jersey City, N.J., and sold under the name "Catalyst XRF"). The high temperature step was conducted at 150° C. and at 163° C.

Data obtained on samples C and D are set forth in Table XVI. It is noted that the higher temperature produced a larger amount of reacted disulfide.

TABLE XVI

| Sample | Treating solution (percent) | | High temp. step, (° C.) | Percent | |
|---|---|---|---|---|---|
| | Disulfide | Amine hydrochloride solution | | Weight increase | Yield |
| C | 8.7 | 3.0 | 150 | 6.4 | 83 |
| D | 8.7 | 3.0 | 163 | 6.7 | 85 |

Crease recovery data on samples C and D are set forth in Table XVII.

TABLE XVII

| Sample | Crease recovery (W+F), degrees | |
|---|---|---|
| | Dry | Wet |
| C | 260 | 241 |
| D | 247 | 233 |

Example 19

Samples of 80 x 80 printcloth of the same type employed in Example 3 were treated with the 3,3'-dithiobis[N-(hydroxymethyl) propionamide] produced as described in Example 1. The reagent was padded on the fabric from a solution composed of dimethylformamide and water (2:1 by weight) which contained magnesium chloride (15% MgCl₂ based on the weight of the reagent). The pH of the pad bath was varied (7.4, and 3.8 by means of dilute acetic acid). After padding, the fabric samples were framed to the original dimensions, dried, cured (5 minutes at 150° C.), washed thoroughly, framed, and dried. Data relating to the fabric samples treated by this technique of padding and acid-catalyzed curing are summarized in Table XVIII.

TABLE XVIII

| Sample | Pad bath pH | Percent | | | | Found by analysis, percent | | | (W+F) crease recovery angle, degrees | | Warp tensile strength, pounds |
|---|---|---|---|---|---|---|---|---|---|---|---|
| | | Reagent, OWF | Moisture regain | Corr. wt. gain | Efficiency of utilization | N | S | Bound CH₂O | Dry | Wet | |
| A | 7.4 | 11.3 | 6.27 | 4.9 | 50 | 0.87 | 1.53 | 0.94 | 256 | 258 | 45 |
| B | 3.8 | 11.3 | 6.17 | 7.5 | 70 | 0.95 | 1.92 | 1.58 | 273 | 284 | 32 |

Example 20

Cotton samples E, F and G, which were previously treated according to the procedure of Example 17, were padded with 0.5 molar aqueous ammonium thioglycollate (ATG) solution (pH adjusted to 9.0 by addition of ammonium hydroxide) using a laboratory padder and setting the rolls at a pressure to give 90–100% wet pickup. The fabric samples so treated were framed and dried at 60° C., then heated to 150° C. for 2 minutes in a forced draft oven. The samples were rinsed in dilute acetic acid solution, then in water, finally framed and dried at 60° C.

A portion of each of samples E, F and G was then immersed for 5 hours in a 0.05 N iodine solution buffered to pH 7. After this period of immersion the samples were rinsed first in water, then in 3% sodium thiosulfate solution for 1 hour, and finally in water. The portions were then framed and dried at 60° C.

The ATG treatment was intended to show the reversibility of the disulfide linkages by conversion to mercapto groups. Table XIX indicates for samples E, F and G, the mercapto content after ATG treatment. The iodine treatment was intended to oxidize the mercapto radicals and convert them to disulfide, thus reversing the character of the sulfur portion of the reactant. Table I indicates that the iodine treatment lowered the percentage of mercapto radicals in the fabric, as expected.

TABLE XIX

| Sample | Percent Mercapto Content | |
|---|---|---|
| | After ATG | After iodine |
| E | 1.42 | 0.59 |
| F | 1.02 | 0.33 |
| G | 1.0 | 0.1 |

The effects of the ATG and iodine treatments on the crease recovery of samples E, F and G are shown in Table XX.

TABLE XX

| Sample | Crease recovery (W+F), degrees | | | | | | Percent weight increase |
|---|---|---|---|---|---|---|---|
| | Before ATG treatment | | After ATG treatment | | After iodine treatment | | |
| | Dry | Wet | Dry | Wet | Dry | Wet | |
| E | 267 | 270 | 226 | 230 | 242 | 248 | 7.5 |
| F | 259 | 264 | 220 | 227 | 248 | 248 | 5.2 |
| G | 248 | 248 | 186 | 207 | 227 | 239 | 3.0 |

As can be seen from Table XX, treatment with ATG decreases the crease recovery. This is expected since disulfide crosslinkages have been broken and converted to mercapto radicals. The iodine treatment reforms the crosslinkages by converting mercapto to disulfide and therefore the crease recovery is increased.

Table XX shows that the percent weight increase is different for samples E, F and G. Sample E, having the highest percent weight increase, exhibits the highest crease recovery. This is expected since sample E has the largest number of crosslinkages.

Example 21

Example 20 was repeated on sample H to provide a 5.0% weight increase. However, instead of using iodine for the oxidation, the sample was exposed to humid air (65° F., 70% RH), after the ATG treatment. Table XXI shows crease recovery measurements made on sample W.

TABLE XXI

| | Crease recovery (W+F), degrees | |
|---|---|---|
| | Dry | Wet |
| Before ATG treatment | 255 | 258 |
| After ATG treatment, immediately | 198 | 216 |
| After 24 hours | 229 | 234 |
| After 48 hours | 236 | 232 |

From the increase in crease recovery, it is apparent that humid air is sufficient to reoxidize the mercapto groups formed during the ATG treatment.

Example 22

Viscose rayon fabric (commonly known as rayon challis) samples were treated with a disulfide produced as described in Example 1. The disulfide was dissolved in a 1:1 by weight dimethylformamide-water solution. Two different materials were used to provide acidic conditions—the magnesium chloride used in Example 17 and the amine hydrochloride used in Example 18.

The samples were impregnated using a laboratory padder and setting the rolls at a pressure to give 95–100% wet pick-up.

The fabric samples so treated were framed to the original size, dried at 60° C. and heated to 160° C. for 4 minutes in a forced draft oven. The samples were rinsed in a 1:1 dimethylformamide-water mixture and washed with non-ionic detergent. The samples were then framed to original dimensions and dried.

Table XXII shows data obtained on samples treated with a solution containing 6.0% of a commercial buffered magnesium chloride solution.

TABLE XXII

| Sample | Percent | | | Crease recovery (W+F), degrees | |
|---|---|---|---|---|---|
| | Disulfide in solution | Weight increase | Yield | Dry | Wet |
| I | 6.0 | 2.2 | 44 | 257 | 197 |
| J | 12.0 | 4.1 | 42 | 264 | 188 |

Table XXIII shows data obtained on samples treated with a solution containing 3.0% of a commercial amine hydrochloride solution.

TABLE XXIII

| Sample | Percent | | | Crease recovery (W+F), degrees | |
|---|---|---|---|---|---|
| | Disulfide in solution | Weight increase | Yield | Dry | Wet |
| L | 6.0 | 2.2 | 46 | 265 | 191 |
| M | 12.0 | 4.0 | 38 | 245 | 191 |

An untreated control had a dry crease recovery (W+F, degrees) of 195 and a wet crease recovery of 165.

Example 23

Rayon challis samples N and P, which were previously treated according to Example 22, were padded with 0.5 molar ammonium trioglycollate (ATG) solution (pH adjusted to 9.0 by addition of ammonium hydroxide), using a laboratory padder and setting the rolls at a pressure to give 90–100% wet pickup. The fabric samples so treated were framed to the original size and dried at 60° C., then heated to 150° C. for 2 minutes in a forced draft oven. The samples were rinsed in dilute acetic acid solution, then in water, finally framed and dried at 60° C.

A portion of each sample was exposed to humid air (65° F., 70% RH).

Data obtained on the samples are set forth in Table XXIV.

TABLE XXIV

| Sample | Percent weight increase | Crease recovery (W+F), degrees | | | | | |
|---|---|---|---|---|---|---|---|
| | | Before ATG treatment | | After ATG treatment | | After 72 hours air exposure | |
| | | Dry | Wet | Dry | Wet | Dry | Wet |
| N | 4.1 | 236 | 189 | 213 | 203 | 253 | 210 |
| P | 2.2 | 249 | 197 | 190 | 194 | 244 | 216 |

Example 24

The procedural details of Example 19 were followed, except that the reagent was dithiobis[N-(hydroxymethyl) acetamide, and the actual pH values of the pad bath were slightly different from those of Example 19. Data relating to the fabric samples so treated are summarized in the accompanying Table XXV.

acterization, a portion was treated with hydrogen peroxide as per Example 15. Data on the products resulting from

TABLE XXV

| Sample | Pad bath pH | Percent | | | | Found by analysis, percent | | | (W+F) crease recovery angle, degrees | | Warp tensile strength, pound |
|---|---|---|---|---|---|---|---|---|---|---|---|
| | | Reagent, OWF | Moisture regain | Corr. wt. gain | Efficiency of utilization | N | S | Bound CH$_2$O | Dry | Wet | |
| A | 6.0 | 19.2 | 6.1 | 7.8 | 48 | 1.05 | 2.26 | 1.77 | 302 | 256 | 40 |
| B | 3.6 | 19.2 | 5.7 | 9.5 | 58 | 1.23 | 2.72 | 2.28 | 292 | 238 | 34 |
| C | 6.0 | 11.3 | 6.5 | 5.8 | 61 | 0.68 | 1.93 | 1.34 | 282 | 250 | 39 |
| D | 3.6 | 11.4 | 6.4 | 7.3 | 75 | 0.89 | 2.25 | 1.79 | 290 | 245 | 38 |

EXAMPLE 25

A sample of fabric resulting from treatment similar to that of Example 19 was immersed in 0.2-normal sodium hydroxide for 30 minutes at room temperature with the fabric-to-liquor ratio at 1-to-30 by weight. Processing steps resembled those described in Example 4. The resulting product comprised mainly the thiol form with some pendant —CH$_2$NHCOOH$_2$CH$_2$SO$_2$H and —CH$_2$NHCOCH$_2$CH$_2$SO$_3$Na groups. Data are summarized in Table XXVI. Inasmuch as both reduced and oxidized forms of the starting material are formed, this cleavage of the disulfide is known as disproportionation.

this series of reversible reactions are summarized in Table XXVIII.

TABLE XXVIII

| Sample | Form | W+F crease recovery angle, Deg. | | Warp tensile strength., lbs. | N Percent | S Percent |
|---|---|---|---|---|---|---|
| | | Dry | Wet | | | |
| C | Mainly thiol | 208 | 281 | 30 | | |
| D | Disulfide | 230 | 269 | 31 | 0.48 | 1.33 |
| E | Thiol | 204 | 189 | 31 | | |
| F | Disulfide | 229 | 269 | 33 | | |

Example 27

The crosslinked product of Example 25 (Sample B) was treated with tetrakis(hydroxymethyl)phosphonium chloride using a procedure similar to that described in Example 8. The product was characterized (as shown in Table XXIX) and then a portion of it was treated as described in Example 5 with hydrogen peroxide. The reversible cycle was repeated twice more. Data are summarized in Table XXIX.

TABLE XXIX

| Sample | Form | W+F crease recovery angle, deg. | | Warp tensile strength, lbs. | Percent | | |
|---|---|---|---|---|---|---|---|
| | | Dry | Wet | | N | Total | Thiol |
| B | Disulfide | 266 | 280 | 32 | 0.55 | 1.92 | None |
| U | Thiol | 165 | 234 | 33 | 0.40 | 0.98 | 0.76 |
| V | Disulfide | 248 | 258 | 28 | 0.54 | 1.35 | 0.14 |
| W | Thiol | 164 | 210 | 33 | | | 0.62 |
| X | Disulfide | 225 | 251 | 30 | 0.42 | 0.93 | None |
| Y | Thiol | 167 | 224 | 28 | | | 0.40 |
| Z | Disulfide | 226 | 243 | 28 | 0.43 | 0.88 | None |

Example 28

A sample of cross-linked fabric resulting from treat-

TABLE XXVI

| Sample | Form | W+F crease recovery angle, Deg. | | Warp tensile strength., lbs. | Percent | |
|---|---|---|---|---|---|---|
| | | Dry | Wet | | N | S |
| A | Untreated | 182 | 172 | 56 | 0 | 0 |
| B | Disulfide | 266 | 280 | 32 | 0.55 | 1.92 |
| C | Mainly thiol | 208 | 281 | 30 | | |

EXAMPLE 26

The mainly thio product of Example 25 (Sample C) was treated with hydrogen peroxide using conditions similar to those described in Example 5. The resulting crosslinked product was characterized (as shown in accompanying Table XXVIII) and then a portion of it was immersed in 0.2-normal soidum hydroxide according to the procedure described in Example 25. Again, after charment similar to that of Example 24 (Sample A) was immersed in 0.2-normal sodium hydroxide for 30 minutes at room temperature with the fabric-to-liquor ratio at 1-to-30 by weight to produce the predominantly thio form (Sample B). Processing steps resembled those described in Example 4. Then the fabric was treated with hydrogen peroxide using conditions similar to those described in Example 5 (Sample C). Then a portion of Sample C was immersed in 0.2-normal sodium hydroxide according to the procedure described in Example 25, to give Sample D, a portion of which was treated with hydrogen peroxide as per Example 5, to give Sample E.

In another series, another sample resulting from treatment similar to that of Example 24 (Sample G) was treated wtih tetrakis(hydroxymethyl)phosphonium chloride using a procedure similar to that described in Example 8 to produce the thiol form (Sample H). Then a portion of it was treated in a manner similar to Example 5 with hydrogen peroxide to form cross-linked Sample J. The reversible cycle repeated twice more (Samples K–N). Data on these two series of samples are summarized in Table XXX.

TABLE XXX

| Sample | Form | W+F crease recovery angle, deg. | | Warp tensile strength, lbs. | N, percent | S Total percent | Thiol percent |
|---|---|---|---|---|---|---|---|
| | | Dry | Wet | | | | |
| A | Disulfide | 289 | 229 | 38 | 0.89 | 2.25 | None |
| B | Thiol (mainly) | 212 | 257 | 40 | | | 0.45 |
| C | Disulfide | 251 | 280 | 36 | 0.73 | 1.53 | 0.06 |
| D | Thiol | 183 | 237 | 34 | | | 0.23 |
| E | Disulfide | 239 | 255 | 31 | | | None |
| G | do | 289 | 229 | 38 | 0.89 | 2.25 | None |
| H | Thiol | 194 | 230 | 39 | 0.65 | 1.68 | 1.30 |
| J | Disulfide | 264 | 215 | 38 | 0.60 | 1.39 | 0.41 |
| K | Thiol | 186 | 229 | 38 | | | 0.75 |
| L | Disulfide | 245 | 256 | 31 | 0.55 | 1.15 | None |
| M | Thiol | 169 | 226 | 33 | | | 0.58 |
| N | Disulfide | 237 | 218 | 29 | 0.44 | 0.24 | None |

Example 29

Plain weave cotton samples (commonly known as 80 x 80 print cloth) were treated with a disulfide having the following formula:

The disulfide was dissolved in a 1:1 by weight ethanol-water solution containing magnesium chloride or amine hydrochloride, as described in the examples above.

The fabric samples were impregnated using a laboratory padder with the rolls set to provide 90–100° wet pickup.

The padded samples were framed and dried at 60° C. Samples Q and R were then heated to 150° C. for 4 minutes in a forced draft oven. Samples S and T were treated to 176° C. for 4 minutes in a forced draft oven. The samples were thoroughly rinsed and washed in dilute detergent solution and framed and dried.

Table XXXI sets forth data on samples treated with a solution containing 6.0% of the magnesium chloride solution.

TABLE XXXI

| Sample | Percent disulfide in solution | Percent weight increase | Percent S actual |
|---|---|---|---|
| Q | 5.0 | 0.6 | |
| R | 15.0 | 1.1 | 0.33 |

Table XXXII sets forth data on samples treated with a solution containing 3.0% of an amine hydrochloride solution.

TABLE XXXII

| Sample | Percent disulfide in solution | Percent weight increase | Percent S actual |
|---|---|---|---|
| S | 5.0 | 1.1 | 0.35 |
| T | 15.0 | 1.5 | 0.43 |

Example 30

The general procedure of Example 29 was repeated on cotton samples U, V, W and X. However, in this example, a 10% by weight aqueous solution of 2-thioglyceraldehyde was used. For samples U and V the solution also contained 5.0% of magnesium chloride solution as used in Example 17, and for samples W and X the solution contained 2.0% of the amine hydrochloride solution used in Example 18.

The data obtained on samples U, V, W and X are set forth on Table XXXIII below:

TABLE XXXIII

| Sample | Percent weight increase | Percent yield | Crease recovery (W+F), degrees | |
|---|---|---|---|---|
| | | | Dry | Wet |
| U | 4.0 | 51 | 236 | 186 |
| V | 5.3 | 68 | 237 | 182 |
| W | 4.3 | 56 | 227 | 184 |
| X | 5.8 | 75 | 238 | 192 |

NOTE: The sulfur content of sample X after the treatment was 2.5%.

The sulfur content of sample X after the treatment was 2.5%.

It is to be appreciated that the specific examples set forth above are intended to be illustrative of the present invention and variations may be made therein by one skilled in the art without departing from the spirit and scope of the present invention.

What is claimed is:

1. A compound having the following formula:

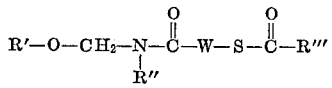

wherein R' and R'' are each hydrogen or substituted or unsubstituted alkyl having from 1 to 4 carbon atoms; R''' is hydrocarbyl of 1 to 10 carbon atoms; W is a substituted or unsubstituted alkylene radical having 1 to 4 carbon atoms, said substituted alkylene being alkylene containing oxygen in the form of a hydroxyl group or an ether linkage.

2. The compound of claim 1 having the following formula:

References Cited

UNITED STATES PATENTS 3,140,295   7/1964   Krespan _____ 260—455 R
3,137,615   6/1964   Ichikawa et al. ____ 260—455 R
3,206,483   9/1965   Guenthard et al. _____ 260—561
2,860,121   11/1958  Stanton et al. _____ 260—561 B

OTHER REFERENCES

Martin et al.: "Amides of N-acylcysteines as Mucolytic Agents" (1967), J. Med. Chem. 10 pp. 1172–1176 (1967).

Tesoro et al.: "Reversible Crosslinks in Cotton Modified etc.; (1967), ACS Meeting, Apr. 11, 1967 J. Pol. Sci. 12 pp. 683–697 (1968).

LEWIS GOTTS, Primary Examiner

G. HOLLRAH, Assistant Examiner

U.S. Cl. X.R.

260—327 R, 561 K, 561 S, 608, 609 R

UNITED STATES PATENT OFFICE
CERTIFICATE OF CORRECTION

Patent No. 3,686,258          Dated August 22, 1972

Inventor(s) Oroslan, et al

It is certified that error appears in the above-identified patent and that said Letters Patent are hereby corrected as shown below:

Col. 3, line 8, "pregnation" should read --preparation--; line 17, "ineffected" should read --unaffected--;

Col. 4, line 25, insert --to-- before "cover".

Col. 6, line 23, insert -- -KCl -- under the arrow; line 65, "collulosic" should read --cellulosic--.

Col. 10, Table I, under S in "Found" column, "346" should read --246--.

Col. 11, Table III under "Dry" column, "184" should read --284--;

line 74, "after" should read -- under --.

Col. 17, Table XIV, in heading "percent $MgCl_2$", "soln.2" should read --soln.--; line 24, "head" should read --headed-- and "Disufide" should read --Disulfide--.

Col. 19, line 49, "W" should read --H--.

Col. 21, line 74, "soidum" should read --sodium--.

Signed and sealed this 20th day of March 1973.

(SEAL)
Attest:

EDWARD M. FLETCHER, JR.         ROBERT GOTTSCHALK
Attesting Officer                Commissioner of Patents